United States Patent [19]

Knudson et al.

[11] Patent Number: 5,765,140

[45] Date of Patent: Jun. 9, 1998

[54] DYNAMIC PROJECT MANAGEMENT SYSTEM

[75] Inventors: James George Knudson, Monument; William Lawrence Vivian, Colorado Springs, both of Colo.; Mark S. Crego, Springfield, Va.

[73] Assignee: MCI Corporation, Washington, D.C.

[21] Appl. No.: 559,970

[22] Filed: Nov. 17, 1995

[51] Int. Cl.⁶ ...................................................... G06F 17/60

[52] U.S. Cl. ................................................................ 705/9

[58] Field of Search ................................ 395/209, 211, 395/201, 207, 208, 232, 926; 705/8, 9

[56] References Cited

U.S. PATENT DOCUMENTS

| | | | |
|---|---|---|---|
| 4,819,162 | 4/1989 | Webb, Jr. et al. | 395/232 |
| 4,937,743 | 6/1990 | Rassman et al. | 398/208 |
| 4,942,527 | 7/1990 | Schumacher | 395/209 |
| 5,111,391 | 5/1992 | Fields et al. | 395/209 |
| 5,117,353 | 5/1992 | Stipanovich et al. | 395/211 |
| 5,172,313 | 12/1992 | Schumacher | 395/211 |
| 5,459,657 | 10/1995 | Wynn et al. | 395/232 |
| 5,557,515 | 9/1996 | Abbruzzese et al. | 395/209 |

OTHER PUBLICATIONS

MCI, "TES Users' Guide–Manager & Budget Coordinator Edition," revised Aug. 1994, pp.: 1–35.
MCI, "TES Users' Guide–Employee & Contractor Edition," revised Aug. 1994 pp.: 1–23.
MCI, "AIMS Users' Guide," revised Aug. 1994, pp.: 1–24.

*Primary Examiner*—Donald E. McElheny, Jr.

[57] ABSTRACT

A dynamic project management system includes a server network and a master database. The network is configured to identify a personnel resource pool including a plurality of users. A project planning tool is used to effect the project plan including a plurality of tasks to be performed by the users in accordance with respective time schedules. The network is configured for translating the project plan into the master database to effect an assignments table including a list of project tasks assigned for completion by each of the users. Time sheets are periodically prepared in the master database from the assignments table and include a list of the project tasks assigned to a respective user and a time period record for recording time entries therein. Actual time expended in performing the tasks is fed back to the project plan for managing completion of the tasks in accordance with the time schedules. In a preferred embodiment, a funding source is mapped to the project plan so that cumulative labor cost may be tracked based on actual time expended for the project tasks.

16 Claims, 3 Drawing Sheets

DYNAMIC PROJECT MANAGEMENT SYSTEM

BACKGROUND OF THE INVENTION

1. Field of the Invention

This invention relates to data processing systems. More particularly, the invention relates to management applications used in data processing systems.

2. Background Information

Large companies employ numerous employees and external contractors for performing various projects in conducting business. Various levels of managers define projects to be performed by employee and contractor personnel in accordance with project plans containing specified tasks requiring completion in accordance with respective time schedules.

Large companies typically utilize programmable computers and associated databases to more effectively manage available personnel and track expended labor hours for following established financial budgets. Various internal and external funding accounts may exist to which personnel may charge their labor time. In one common example, it is required to track work performed in completing a capital project which can be depreciated for tax purposes. Accordingly, a specific Capital Project Appropriation Request (CPAR) is created to which personnel may charge expended time in performing work thereunder.

One conventional system is known as the Automated Issue Management System (AIMS) and is used in conjunction with another conventional system called Entry System (TES) which are used for capitalizing internal and external labor. The systems are contained in conventional programmable computers for more accurately managing the large number of personnel involved and the substantial number of individual tasks associated with various capital projects. A project manager typically initiates a project by opening a specific work request in the AIMS system. The system automatically provides a respective AIMS number, which typically has a correlation to a single CPAR number. The manager assigns personnel to complete tasks based on an AIMS number. The TES system allows personnel to record through a personal computer expended time per AIMS number as the work is completed. The TES system allows the manager to examine cumulative time expended for specific AIMS numbers, with the manager manually correlating the AIMS number to a specific CPAR.

Although the AIMS and TES systems facilitate managing projects in a large company, project planning and managing is nevertheless relatively complex in most circumstances. To further facilitate project management in large companies, commercially available software has been developed. One available management tool or product is conventionally known as Microsoft Project from Microsoft Corp., and another product is ABT Project Workbench from the Applied Business Technology Corporation. These software tools allow companies to define project plans in accordance with tasks and time schedules for available personnel resources, and are typically operated in stand-alone fashion or in conjunction with other commercially available software products for facilitating the overall management of projects. However, these commercially available products are designed for specific applications and are therefore limited in capability, as well as having no built in capability for managing project funding such as the CPAR example introduced above.

SUMMARY OF THE INVENTION

A dynamic project management system includes a server network and a master database. The network is configured to identify a personnel resource pool including a plurality of users. A project planning tool is used to effect the project plan including a plurality of tasks to be performed by the users in accordance with respective time schedules. The network is configured for translating the project plan into the master database to effect an assignments table including a list of project tasks assigned for completion by each of the users. Time sheets are periodically prepared in the master database from the assignments table and include a list of the project tasks assigned to a respective user and a time period record for recording time entries therein. Actual time expended in performing the tasks is fed back to the project plan for managing completion of the tasks in accordance with the time schedules. In a preferred embodiment, a funding source is mapped to the project plan so that cumulative labor cost may be tracked based on actual time expended for the project tasks.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
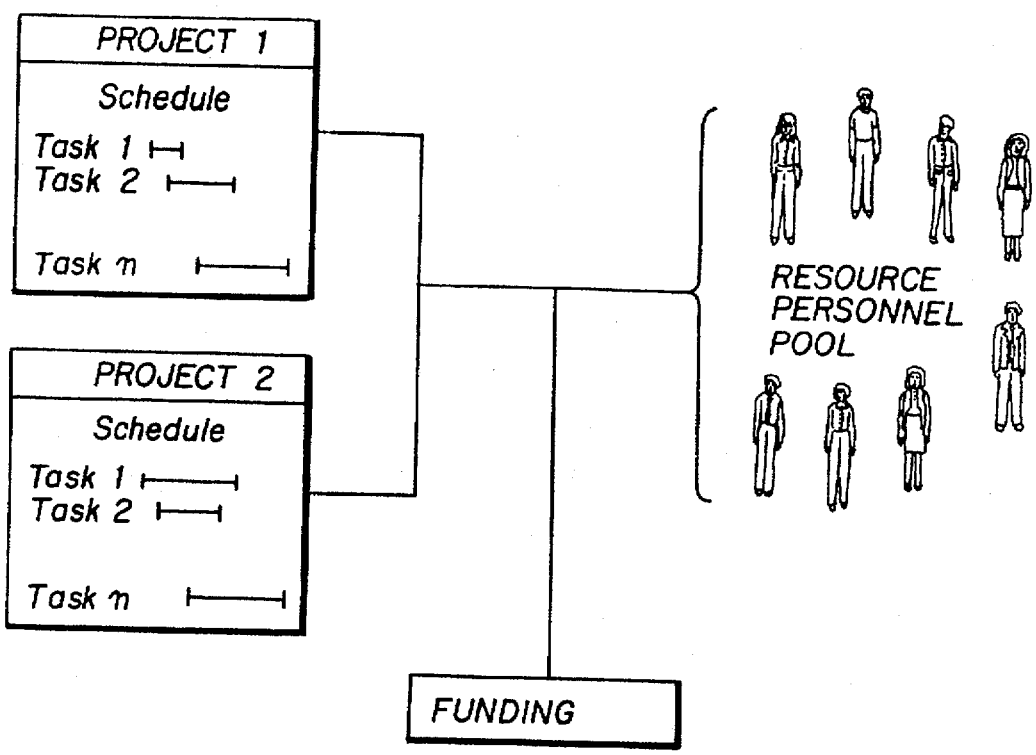
FIG. 1 is a schematic representation of a plurality of projects to be completed by a personnel resource pool using various funding sources.

Illustrated schematically in FIG. 1 are a plurality of project plans, labeled projects 1 and 2 for example, each of which includes a plurality of project tasks which require completion in accordance with respective time schedules as is conventionally known. The various project tasks must be completed by available employees in a typical large company, and by external contractors as required. The employees and contractors define a resource personnel pool from which managers assign one or more tasks to selected individuals from the various projects which must be completed in accordance with respective time schedules. Associated with each of the projects is a respective internal or external source of funding to which each of the project tasks may be assigned.

Figure 2:
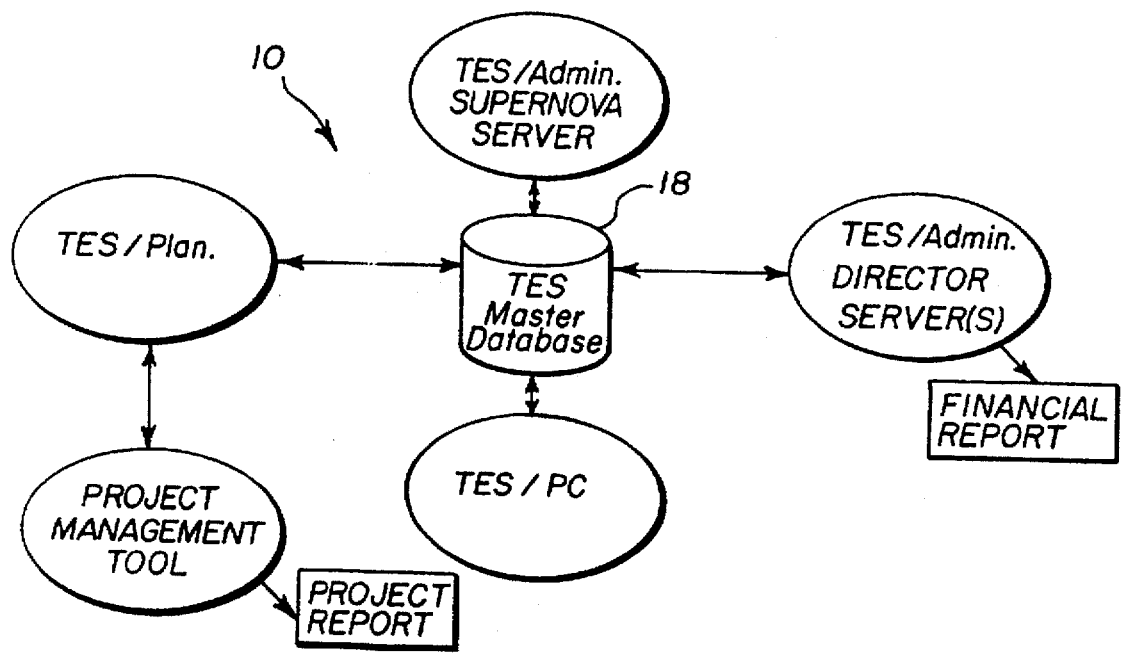
FIG. 2 is a schematic representation of a dynamic project management system having a master database in accordance with one architecture embodiment of the present invention.
Figure 3:
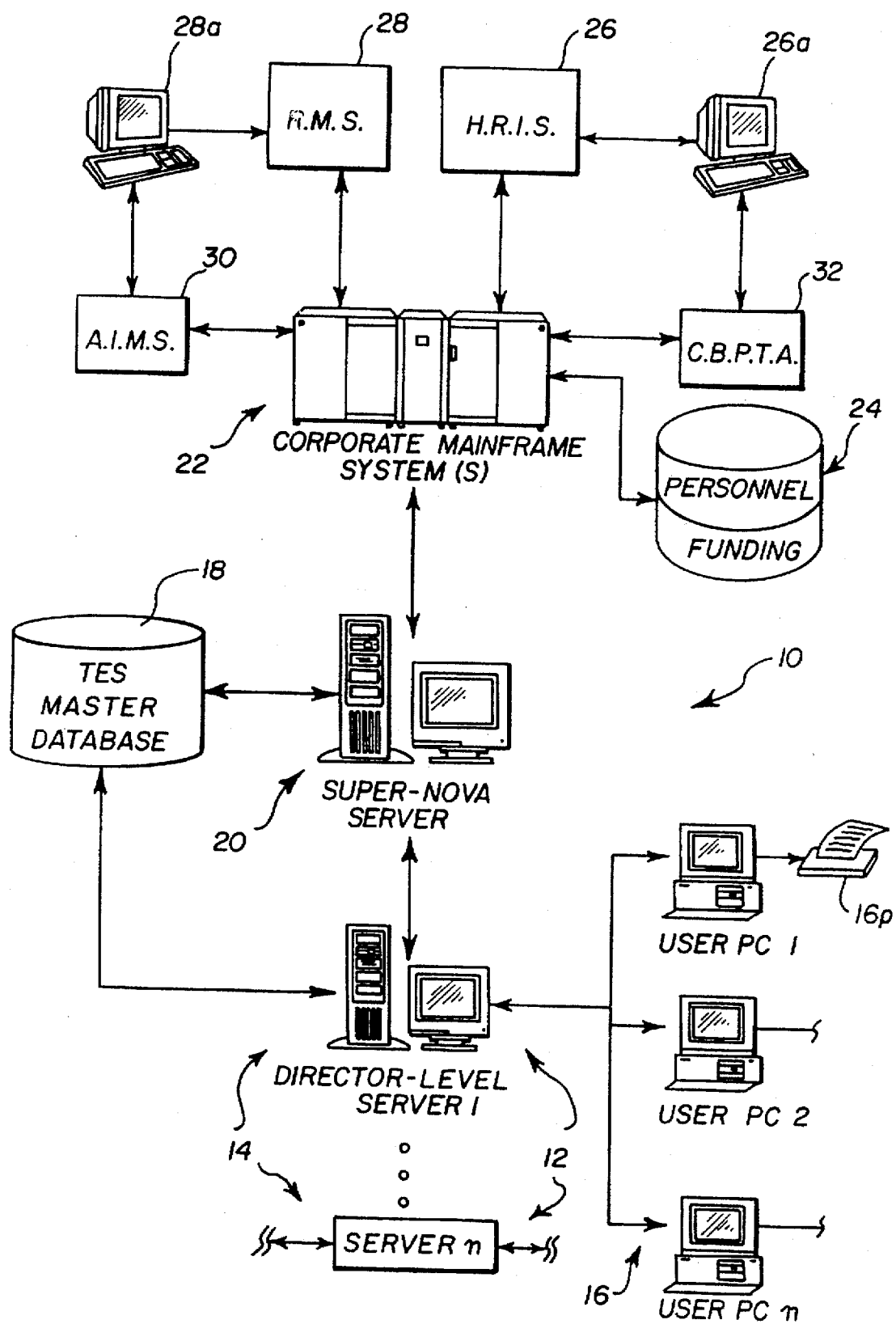
FIG. 3 is a schematic representation of one architecture embodiment for implementing the dynamic project management system illustrated in FIG. 2.

In accordance with the present invention as illustrated schematically in FIG. 2, a dynamic project management system 10 is provided for automatically tracking and controlling project tasks in accordance with the various project time schedules, and the associated funding therefore. FIG. 3 illustrates schematically the architecture or hardware associated with the system 10, with FIG. 2 illustrating schematically the software associated therewith.

Referring firstly to FIG. 3, the system 10 includes one or more conventional server networks 12 each including a director-level programmable digital computer server 14 operatively joined to a respective plurality of programmable personal computer (PC) user terminals 16. The number of user terminals 16 is typically limited, to about 250 terminals for example, for each director server 14, and therefore additional server networks 12 are utilized as required for supporting the specific number of resource personnel available, who are also referred to as users. The director servers 14 may be located at one geographic site, or may be located at various geographically spaced apart sites depending upon the organizational structure of the corresponding company and its needs. Conventional software is used to operate the server networks 12.

The one or more director servers 14, and their associated user terminals 16, are conventionally operatively joined to a common or master database 18 to which data may be written and stored, and from which data may be read by each of the director servers 14 and the various user terminals 16. The master database 18 may reside at any one or all of the director servers 14, and may be defined redundantly at each of the servers 14 if desired.

In the exemplary embodiment illustrated in FIG. 3, the system 10 further includes a supernova-level programmable computer server 20, also referred to simply as a superserver 20, operatively joined to the plurality of director servers 14 and the master database 18. The superserver 20 is conventionally configured and operatively joined to the director servers 14 for suitably downloading and uploading data as described in more detail below.

The system 10 preferably includes in part and cooperates with a pre-existing, conventional programmable mainframe computer system 22 which is operatively joined to the superserver 20. The mainframe system 22 includes a main database 24 having stored therein personnel resource data and funding data. In one company for example, the mainframe system 22 would be employed for maintaining suitable records of available company employees, and outside or external contractors typically used thereby as required, with these workers or users being collectively referred to as personnel. Similarly, the mainframe system 22 would also be used for storing suitable identification of various funding sources, both internal and external to the company, as desired so that work tasks and non-work related charges such as vacation and sick days may be associated with a specific funding identification or source.

In one example, the mainframe system 22 conventionally includes a Human Resources Information System (HRIS) 26, which is software implemented and accessible by a conventional terminal 26a. The HRIS system 26 contains, among other things, various data regarding company employees.

The exemplary mainframe system 22 also includes a software implemented Resource Management System (RMS) 28 which is accessed through a corresponding terminal 28a. The RMS system 28 is used to maintain employee and contractor information required for monitoring utilization thereof and cost of development, maintenance, and support of software, for example.

The mainframe system 22 further includes another software implemented conventional Automated Issue Management System (AIMS) 30 which is used for capitalizing internal and external labor. In the AIMS system 30, a manager first opens a work request to begin a Capital project. The AIMS system 30 provides a corresponding AIMS number therefore, which number has a correlation to a single specific funding source such as a CPAR number. The AIMS system 30 is used in conjunction with the conventional time entry system introduced above in which personnel enter expended time in a computer terminal based on the AIMS number itself.

The mainframe system 22 also includes another conventional, software implemented Capital Budget Project Tracking Analysis (CBPTA) system 32 which is used for tracking Capital budgets independently of the AIMS system 30.

In order to effect the Dynamic Project Management System 10 illustrated in FIG. 3, it is desirable to use available or pre-existing hardware and software to advantage for automatically tracking and controlling funding progress and time schedules for various projects. In this regard, the hardware illustrated in FIG. 3 including the master database 18 is used in conjunction with software developed specifically therefore in accordance with the present invention. Although the conventional time entry system software introduced above facilitates time entry by the various users, such time entry is related to the simple AIMS numbers without any direct correlation to either project funding sources or project plans. In accordance with the present invention, the Dynamic Project Management System 10 includes an improved Time Entry System (TES) configured for specifically associating time tracking with separately developed project plans, as well as funding information.

As illustrated in FIG. 2, the TES software in accordance with the present invention includes three portions or modules referred to separately as TES Administrator (TES/Admin), TES planning (TES/Plan), and TES Personal Computer (TES/PC). Each of these three modules respectively addresses the specific need of personnel resource management, project planning, and time entry in an interrelated cooperation using the common or master TES database 18. The TES/Admin software resides in the exemplary embodiment illustrated in FIG. 2 on both the director servers 14 and the supernova server 20, with different functions being performed on each server as described in more detail below. The TES/PC software resides at the user terminals 16 which are used primarily for entering expended time into the master database 18. This setup allows users to act independently, with the common database 18 being readily maintained independently thereof. And, TES/Plan also resides on the director servers 14 for providing a specifically configured interface with a conventional, commercially available project management tool in accordance with the invention.

More specifically, two examples of commercially available project management or planning software tools include Microsoft Project from the Microsoft Corporation, and ABT Project Workbench by the Applied Business Technology Corporation. Each of these preexisting and predefined software tools provides means for a project manager to plan a desired project to effect a project plan including a plurality of described tasks to be performed by identified personnel or users in accordance with respective time schedules. The TES/Plan module in accordance with the invention as illustrated in FIG. 2 provides means for automatically interfacing the existing project management tool with the TES server network 12 through the common database 18. In order to maximize compatibility between the preexisting project management tool and the TES server network 12, the TES software modules including TES/Plan, TES/Admin, and TES/PC are created using the commercially available Microsoft Visual Basic software which allows users to interface with the system at their respective terminals using "windows" analogous to those found in the well known Microsoft Windows software.

Since the project management tool creates project tasks and assigns them to identified users, it is desirable to correlate identification of the users in the project tool to actual users in the Project Management System 10 already identified therein. More specifically, the mainframe system 22 previously described with respect to FIG. 3 includes the main database 24 which identifies available employee and contractor personnel. Accordingly, the TES/Admin software module which resides on the superserver 20 illustrated in FIG. 3 is used as a resource administrator for the TES applications and is used in conjunction with the existing mainframe system 22 as means for providing or identifying a personnel resource pool from the personnel data stored in the main database 24.

TES/Admin is used to provide each of the personnel or users with a corresponding identification profile which is used to advantage in the TES system including the project management tool. Each user profile includes a unique identifier, such as a four character identification (ID), that identifies each user in the system 10 and controls access thereto. The user profile also includes the user's name and a password which may be selected by the user; a reporting-to manager; a time sheet approving manager; and a security or access level flag, for example for levels 1 through 9, which determines permitted access to various functions of the TES system 10. The user profile also includes a directorate, or department and location, identification which allows the user profiles to be organized to correspond with respective ones of the director servers 14, with respective director servers 14 being used locally to service or administer each of the users assigned within its jurisdiction.

Since the superserver 20 is operatively joined to the mainframe system 22, the TES/Admin module at the superserver level is configured to effect the personnel resource pool by downloading employee information from the HRIS system 26 and may be used to manage employee transfers, additions, terminations, and associated information. Contractor profiles are maintained by downloading data from the RMS system 28 in a similar manner, with the respective personnel data being retrieved from the main database 24. The personnel profiles are organized by TES/Admin by directorate which is associated with a respective one of the director servers 14.

And, most significantly, the available personnel resource pool as identified by their respective profiles is also available for use in each of the director servers 14 by project managers for use in developing required project plans using the project management tool shown in FIG. 2. The project management tool may reside at any one or all of the director servers 14, and preferably uses a personnel resource template therein identifying users selected by project managers using TES/Admin from the available personnel resource pool maintained in the master database 18. The TES/Plan interface module illustrated in FIG. 2 downloads to the project management tool identified users from the personnel resource pool for use in assigning tasks thereto in accordance with the project plan separately developed by the project management tool.

Any project manager can create one or more project plans using the project management tool as accessed through any user terminal 16, with the manager's own user profile being associated therewith for in effect owning or controlling the respective project plans. These first two steps of the overall method are illustrated in flow chart form in FIG. 4 to initially create the user profiles using the TES/Admin module, and then creating one or more project plans using the commercially available project management tool based on the so created user profiles. Project managers may also use TES/Admin to define general tasks to be completed by selected users independently of the project management tool.

The TES/Plan interface module is also configured for translating the project plan developed in the project management tool into the TES master database 18 illustrated in FIGS. 2 and 3 to assign project tasks to individual users by effecting an assignments table in the master database 18 which includes a list of project tasks assigned for completion by each of the identified or assigned users. The assignments table resides in the common or master database 18 and is accessible by each of the director servers 14 and lists assigned tasks for one or more projects for each of the identified users.

The TES/Plan interface module extracts the tasks and assignments from the project management tool using one of two exemplary methods. For the Microsoft Project tool, conventional Object Linking Embedded (OLE) is used. The tasks and assignments are saved in the TES master database 18 exactly in the same format as the Microsoft Access database created by Microsoft Project which makes project loading and project updating extremely easy to perform in the TES software. For the ABT Project Workbench, the ABT project file is saved by the user manager in a conventional comma-delimited format. The TES/Plan module may then update directly this comma-delimited file. In all cases, the four character unique user identifier serves as the key database field to interface the project management tool with the remainder of the TES system 10.

Referring again to FIG. 4, after the assignments table is created in the master database 18 for assigning project tasks to users identified by their user profiles, the TES/PC software module illustrated in FIG. 2 is then used by the users for manually entering actual or expended time in accomplishing the project tasks using a visual or virtual time sheet.

Figure 4:
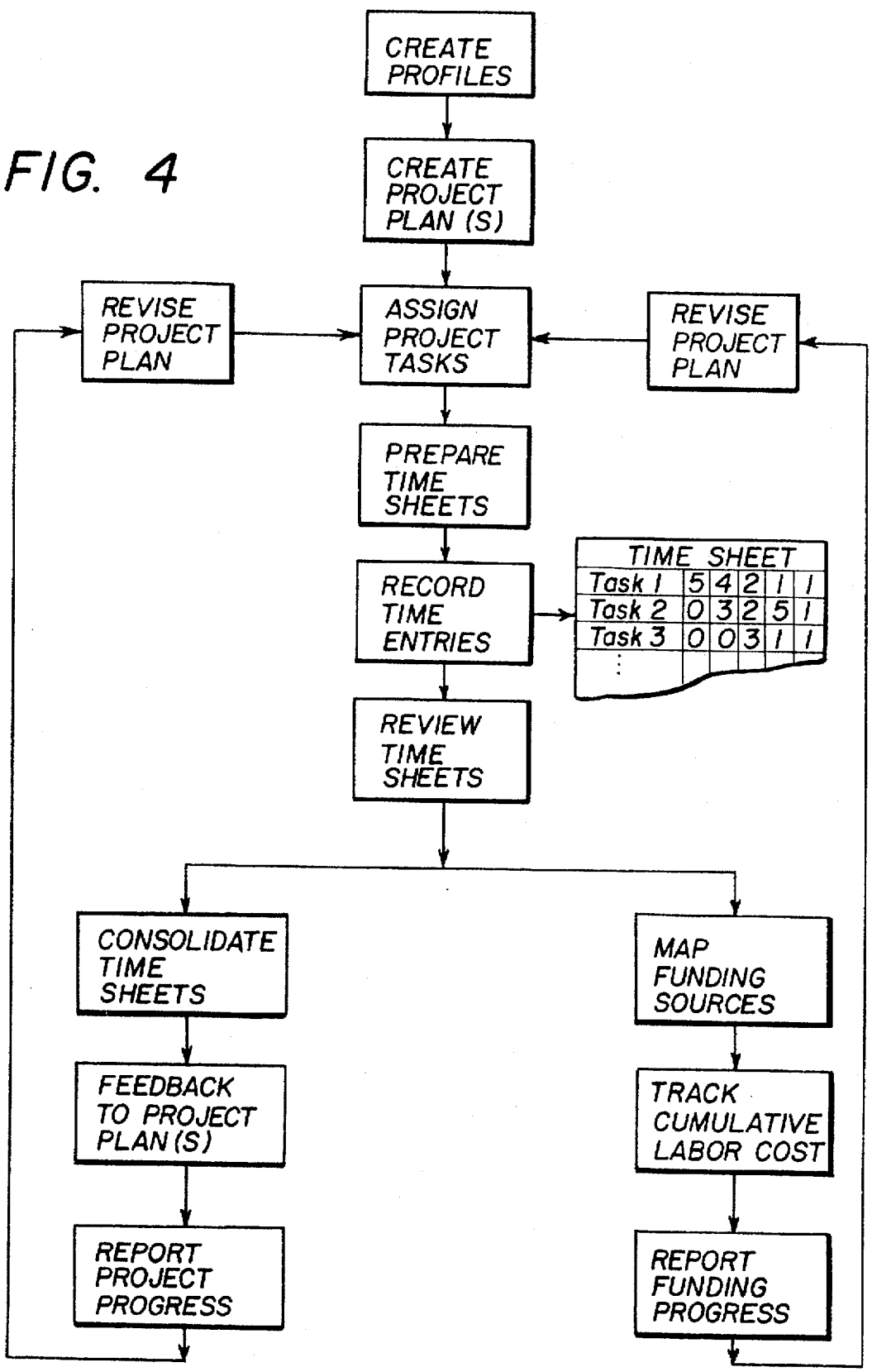
FIG. 4 is a flow chart illustrating exemplary method steps in effecting the dynamic project management system illustrated in FIGS. 2 and 3.

More specifically, the TES/PC software module which resides at each of the user terminals 16 illustrated in FIG. 3 and allows access by authorized users to the common master database 18 illustrated in FIGS. 2 and 3. The TES/PC module provides means for periodically, on a weekly schedule for example, preparing in the master database 18 from the assignments table therein a plurality of virtual time sheets, one for each respective user, with each time sheet listing the several project tasks assigned to a respective user and a time period record for manually recording time entries by the users indicative of actual time expended by each user in performing the respective task. As shown in FIG. 4, the times sheets are automatically prepared for each user and provide a simple vehicle for the user to enter actual time expended against identified and described project tasks, which is a significant advantage over the conventional time entry system which allows time entry based on the simple AIMS number.

A schematic representation of a portion of an exemplary time sheet is illustrated in FIG. 4 for a given time period such as an identified week during which listed tasks may be completed in accordance with the time schedules established in the project management tool. Since the TES/PC software module is also written in Microsoft Visual Basic software, it will have the typical Microsoft "windows" appearance although being configured to suitably identify individual users, and list their assigned project tasks by name and/or description, and provide suitable table records in which expended time may be recorded against assigned tasks. The time sheet preferably also includes a comments region in which the user may provide any suitable comments directed to the approving manager. The TES/PC module may be suitably configured as desired for displaying one or more suitable windows for informing each user of assigned tasks and time schedules therefore, while allowing the user to enter actual time expended in performing the tasks, as well as estimated time to completion for the tasks. Various other categories may also be presented in the windows which are typically used in conventional time sheets including recording vacation, illness, or personal business days for example. Of primary significance, however, is the ability for users to enter labor expended against specific tasks, instead of entering time on simple AIMS numbers which will allow project teams to track and control projects with improved efficiency and accuracy.

After a user completes a time sheet, it is stored in the master database 18 and may be printed by the user at any time using a conventional printer 16p as illustrated in FIG. 3. Each user is assigned a time approving manager who has security access to the time sheet data and is required to review the time sheets and either approve or reject the entries made therein. If rejected, the user is suitably alerted via the network so that any required corrections may be made thereto. Once time sheets are approved, the data contained therein are then available for further analysis and use in the TES system 10.

For example, and as shown in FIG. 4, the TES/Plan module is also configured to organize and consolidate the time sheet entries as desired for individual projects and tasks therein, which data is then fed back to the project plans in the project management tool. This provides the project manager an accurate feedback loop on actual progress made against a specific project plan. Suitable project progress reports may be configured for examination by the project manager either visually on his user terminal or may be printed as desired for managing completion of the project tasks in accordance with the various time schedules. The actual time expended by the user is simply fed back into the assignments table maintained in the master database 18 in the same format as required for access by the project management tool. In this way, project managers may periodically track and control project progress in accordance with the previously defined time schedules. If required, the project management tool may be used to revise the various project plans and in turn update the assignments table maintained in the master database 18 to adjust assigned tasks and time schedules as required for the various identified users.

The TES/Admin module residing at the superserver illustrated in FIG. 2 also provides means for administering the personnel resource pool to effect changes thereto and in turn changes to the assignments table maintained in the master database 18. The personnel resource pool may be modified in response to transfers, additions, and terminations of users, as well as changing user profiles as required. For example, user passwords may be reset as desired and changes of directorate and reporting or approving managers may also be changed. Security level access to the TES system 10 may be changed as required by modifying the corresponding security level flag or parameter. The lowest level security is that for the individual users for allowing their access to the user terminals 16 for entering time therein. Reporting and department managers have a correspondingly higher security level for allowing their access to the TES system 10 as required for completing their responsibilities. Project managers are given suitable security level access to load projects into TES/Plan which are created in the project management tool and develop or revise project plans. The highest level of security resides at the superserver level for administering all aspects of the TES system 10 including the personnel resource pool.

Another significant feature of the present invention is the ability of the TES/Admin module to map or assign a specific funding source to a specific project or project plan so that cumulative labor costs therefore may be tracked based on actual time expended for the project tasks by the assigned users.

As illustrated in FIG. 4, the TES/Admin module is suitably configured to map a desired funding source to specific projects and project tasks therein identified in the individual time sheets and stored in the assignments table in the master database 18. As illustrated in FIG. 3, existing funding sources are identified in the main database 24 of the mainframe system 22 which may be downloaded as desired for association with respective project plans identified in the master database 18. A specific funding source may be readily linked to a specific project plan in the master database 18 so that cumulative labor cost therefore may be tracked. The funding sources may either be internal to the company, or external such as joint venture credits and alliance reporting. Also, temporary funding sources may be generated in TES/Admin that can later be mapped to valid corporate accounts if desired. A typical corporate funding source is the conventional CPAR. And, funding sources for specific project plans may be changed periodically as desired using the TES/Admin module.

As illustrated in FIG. 4, tracking cumulative labor costs for the individual project plans may then be used for reporting funding progress for the plans, which allows a project manager to revise project plans as required in the project management tool and correspondingly revise the assignments table in turn. In this way, the TES system 10 allows tracking of not only project progress in accordance with the time schedules, but also tracking of cumulative labor cost as actually expended by users in performing the project tasks. The project plans may therefore be suitably revised as required to accommodate time schedule and funding concerns.

Although the TES/Admin software module and the TES/Plan module may be maintained on a single director level server 14, it is desirable to create the multi-level hierarchy architecture illustrated in FIG. 3 for integrating the TES modules with the mainframe system 22 for improving performance. For example, the TES/Admin module residing at the superserver 20 may be effectively used for identifying all director server locations; identifying all authorized users and their respective server locations; feeding all applicable data to the director servers 14; and consolidating and backing up data from the director servers 14. The superserver 20 provides a repository for consolidated project data from all downstream director servers 14, and performs all required interface functions with the corporate mainframe systems 22.

Through downloads from the corporate system 22, the TES/Admin module identifies available users based on active employees and contractors from the personnel data residing at the main database 24. It also validates the funding information for the various project plans based on the corporate accounting systems residing at the corporate level. Upgrades to the various TES software modules may be also downloaded as required.

Through uploads to the corporate mainframe system 22, the TES/Admin module provides managed labor feed to the appropriate corporate time accounting systems, including all applicable required edits. Conventional corporate time accounting requirements are expanded to include functionality for billing and charge back of labor to external alliances and joint ventures.

The TES/Admin module residing at the director level preferably provides at this level the ability to set user parameters including for example, user access to all TES software; passwords; approving managers and subordinate roll up structure; and user roles. User role definitions for TES/Admin use include identification of approving managers, without budget authorization; department managers, with complete authorization for selected departments; project managers, having complete authorization for selected projects; and director level administrators having complete authorization for corresponding functions. General tasks independent of the project management tool may be created by responsible managers at the director level for completion by assigned users using a generic time funding category.

The TES/Admin module is preferably also used to define funding relationships for the project plans loaded through the TES/Plan module by linking project plans to corporate funding sources, which may be changed periodically as desired. Temporary funding sources may also be assigned, and direct links to the corporate mainframe system 22 are preferred for validating funding sources and editing as required. And, any type of funding source may be identified including both internal and external funding.

The TES/Admin module is also configured to prepare various reports regarding performance as required. The commercially available Crystal Reports software available from the Crystal Computer Services Company, Inc., of Vancouver, British Columbia, Canada may be used for example. Complete reporting functionality for both financial and project metrics is provided for tracking project time scheduled progress as well as funding progress as addressed above.

And, the TES/PC module residing at the various user terminals 16 allows the two primary functions of time entry interface for authorized employees and contractors, and subsequent approval by approving managers identified in the TES/Admin module. The users enter time against tasks assigned from the project plans loaded in by the TES/Plan module; or general tasks created in the TES/Admin module for the entire directorate; or administrative accounts for vacation, holiday, sickness, and other typical non-work related conditions. The TES/PC module allows for general as well as task level comments for subsequent status reporting and review by managers. The time sheets are entered periodically such as weekly, with the users being able to enter estimated time to completion against assigned tasks which is fed back into the external project planning tool through the update actuals option in the TES/Plan module. And, the individual users may print copies of the time sheets as desired. Approving managers have security level access to view all subordinate time sheets for approval or rejection thereof. Approving managers themselves are allowed to report delinquencies and administrator account information for all subordinates.

The project management system 10 disclosed above may be readily tailored as desired for integrating the various roles of the users and managers in conjunction with the preexisting project management tool and mainframe system 22. In this way, existing personnel data may be suitably downloaded to the project management tool for creating one or more project plans having tasks assigned to specific, pre-identified users in accordance with respective time schedules. The various tasks required in the one or more projects are maintained in the common assignments table residing in the master database 18 so that individual users may access the database via the corresponding time sheets for viewing tasks assigned to the users for completion in accordance with the defined time schedules. The individual users readily enter time expended in completing identified tasks, as well as time to completion if desired. The actual time expended is then consolidated in the master database 18 so that project progress in accordance with the various time schedules may be tracked, and most significantly, cumulative labor expended or labor costs may also be tracked. The original project plans may be revised as desired based on the feedback obtained from the project schedule or funding progress. And, of particular importance is the ability to identify project tasks by description or name instead of a non-descriptive AIMS number as was previously done, which allows integration with the project management tool for tracking and controlling identified projects in accordance with the assigned project task.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A dynamic project management system comprising:
    a server network including a programmable computer server operatively joined to a plurality of personal computer user terminals;
    a master database operatively accessible by said server and said user terminals;
    means for identifying a personnel resource pool including a plurality of users each having an identification profile;
    means for planning a project to effect a project plan including a plurality of tasks to be performed by said users from said resource pool in accordance with respective time schedules;
    means for interfacing said project plan with said server network to effect in said master database an assignments table including a list of said project tasks assigned for completion by each of said users;
    means for periodically preparing in said master database a plurality of time sheets from said assignments table including a list of said project tasks assigned to a respective user and a time period record for recording time entries indicative of actual time expended by each user in performing said tasks; and
    said interfacing means being effective also for feeding back to said planning means from said master database said actual time expended for said tasks for managing completion of said tasks in accordance with said time schedules.

2. A system according to claim 1 further comprising means for administering said personnel resource pool to effect changes thereto and in turn changes to said assignments table.

3. A system according to claim 2 wherein said administering means is effective also for mapping a funding source to said project and tracking cumulative labor cost therefore based on said actual time expended for said project tasks.

4. A system according to claim 3 further comprising a plurality of said server networks operatively joined to said master database to define a respective plurality of director-level computer servers each having a respective plurality of said user terminals, and wherein said planning and interfacing means reside at said director-level servers.

5. A system according to claim 4 further comprising a supernova-level programmable computer server operatively joined to said plurality of director-level servers and said master database, and including said personnel identifying means.

6. A system according to claim 5 further comprising a programmable mainframe computer system operatively joined to said supernova server and including personnel and funding data, and wherein said identifying means effect said personnel resource pool from said personnel data and organize said user profiles to correspond with respective ones of said director servers, and wherein said administering means map said funding source from said funding data to said project.

7. A system according to claim 6 wherein said user profile includes a unique identifier, and said planning means are effective to plan said project around users identified by said identifiers.

8. A system according to claim 7 wherein said user profile further includes a directorate identification for assigning said users to respective ones of said director servers.

9. A method for dynamically managing a project in a server network including a programmable computer server and a master database operatively joined to a plurality of personal computer user terminals, said method comprising:

identifying a personnel resource pool including a plurality of users each having identification profile;

planning a project to effect a project plan including a plurality of tasks to be performed by said users from said resource pool in accordance with respective time schedules;

translating said project plan into said master database to effect an assignments table including a list of project tasks assigned for completion by each of said users;

preparing periodically in said master database time sheets from said assignments table including a list of said project tasks assigned to a respective user and a time period record for recording time entries indicative of actual time expended by each user in performing said tasks; and feeding back to said project plan said actual time expended in performing said tasks for managing completion of said tasks in according with said time schedules.

10. A method according to claim 9 further comprising:

mapping a funding source to said project plan; and tracking cumulative labor cost for said project plan based on said actual time expended for said project tasks.

11. A method according to claim 10 further comprising administering said personnel resource pool to effect changes thereto and in turn changes to said assignments table.

12. A method according to claim 10 further comprising revising said project plan based on at least one of progress in meeting said time schedules and said cumulative labor cost.

13. A method according to claim 10 further comprising planning and translating a plurality of said projects into a common assignments table to effect time sheets for said users containing all project tasks for each user.

14. A method according to claim 10 wherein said project planning step utilizes a preexisting project management tool to effect said project plan.

15. A method according to claim 10 wherein said user profile includes a unique identifier, and further comprising providing said user identifiers to said planning step for planning said project around users identified by said identifier.

16. A method according to claim 10 further comprising downloading personnel data from a preexisting computer system for identifying said personnel resource pool.

* * * * *